though the accompanying illustrative drawing.

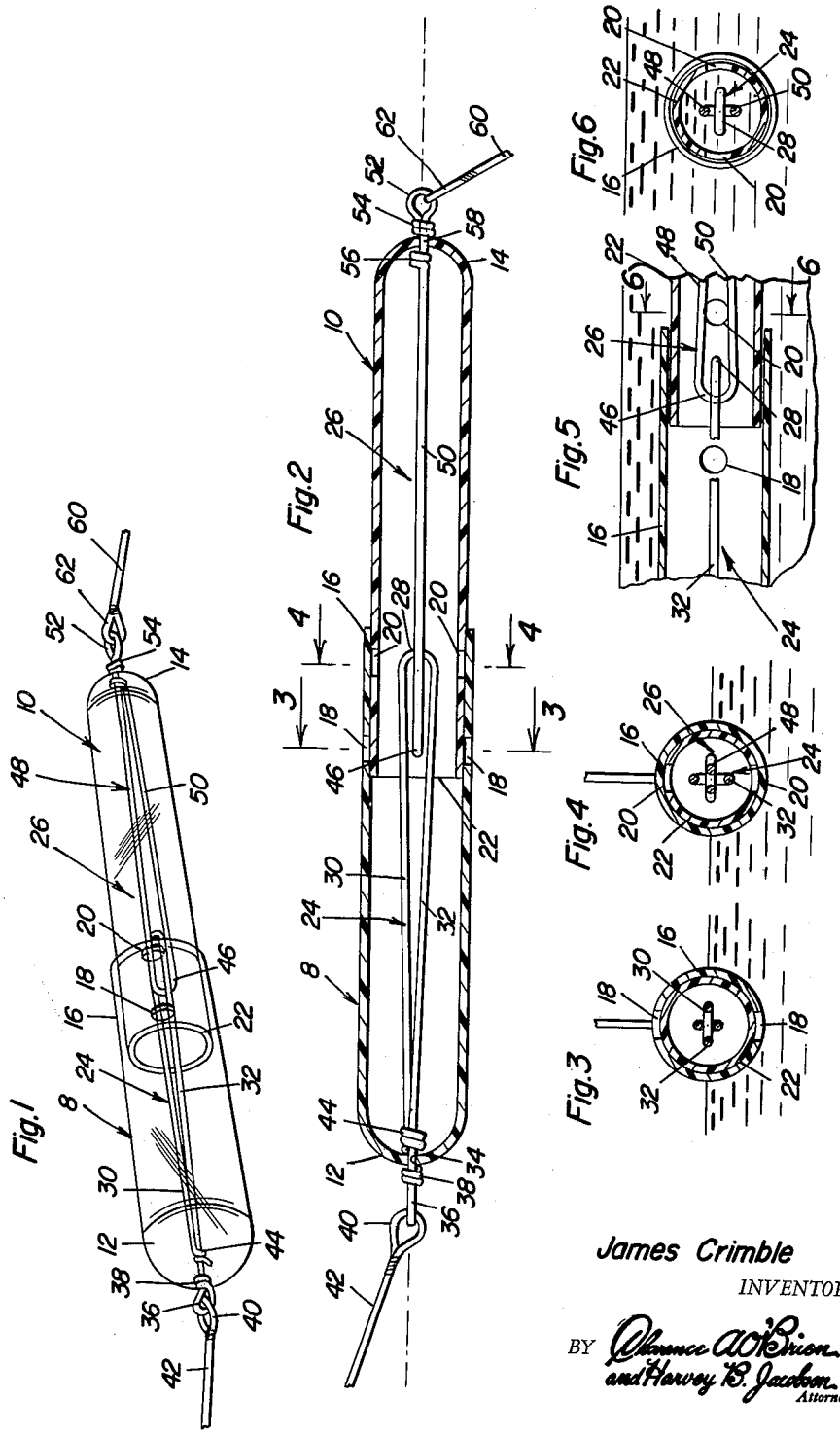

United States Patent Office 2,986,839
Patented June 6, 1961

2,986,839
CONVERTIBLE FLOAT AND SINKER
James Crimble, 105 Exchange, Emporia, Kans.
Filed Oct. 23, 1959, Ser. No. 848,354
5 Claims. (Cl. 43—43.14)

The present invention relates to an improved device which is expressly designed and constructed to be attached to a fishing line and which is readily changeable as to weight so that it may be satisfactorily employed, at the discretion of the fisherman, as a float and, under other circumstances, as a sinker.

The invention may be aptly and satisfactorily used by fishermen, particularly where the fishing activties are to be carried on in running streams with the fisherman operating from a bridge or elevated land or high embankment. When resorting to this mode of fishing, the line is customarily equipped with a bobber or an equivalent float or cork. The bait is allowed to lie on the bottom of the stream. However, the fisherman on the bridge or bank may want to float the bait downstream to a distant spot where he desires to fish. At this point he desires to sink the baited hook. It follows that the line-attached device which is the subject matter of the invention here has to do with a novel hollow elongated capsule having inner adjacent ends of the companion sections telescopically joined and provided with openable and closable water intake and discharge ports. The construction is such that when the capsule is empty and the ports are blocked and thus closed, the then existing chamber is charged with air and float is provided. The float serves to hold the baited line up while it drifts downstream to the desired location. Remote control means is embodied in the capsule and when this is brought into play by jerking sharply on the line, the sections of the float extend and the cooperating ports are unblocked and the device is charged and filled with water, with the result that it then becomes a sinker, causing the baited hook to sink to the bottom of the stream.

In carrying out a preferred embodiment of the invention, transparent capsule sections are fitted telescopically together as already explained, and they are normally pushed into shorten the capsule, at which time the communicable ports are covered or blocked and thus closed and kept closed. Elongated wire members or links are linked together and connected at their outer ends to the respective ends of the capsule sections and have extending eyes beyond the ends of the capsule to accommodate cooperating portions of the fishing line.

Other objects, features and advantages will become more readily apparent from the following description and the accompanying illustrative drawing.

In the drawing wherein like numerals are employed to designate like parts throughout the views:

FIG. 1 is a view in perspective of a convertible float and sinker constructed in accordance with the principles of the present invention and showing the same contracted and serving as a buoyant float.

FIG. 2 is a view on an enlarged scale taken on the central line through the construction seen in FIG. 1 and with parts appearing in section and elevation.

FIGS. 3 and 4, respectively, are cross-sections on the lines 3—3, and 4—4, of Fig. 2, looking in the direction of the arrows.

FIG. 5 is a fragmentary view of the central telescoping portion of the device with the sections extended and the ports open to allow water to flow in.

FIG. 6 is a section on the line 6—6 of FIG. 5.

The two-part or sectional plastic or equivalent capsule is of elongated cigar-shaped form and the forward half section is denoted at 8 and the complemental rearward half section at 10, the leading end of the section 8 being rounded and blunt as at 12 and the corresponding but rearward end of the section 10 being likewise rounded and blunt at 14. The inward open end portion 16 of the section 8 is provided with diametrically opposite orifices or ports 18. The end 22 which telescopes into the end 16 is provided with similar ports 20. The ports are shown out of alignment in FIGS. 1 to 4, inclusive. It follows that the thus telescopically connected sections provide a hollow capsule, the air chamber providing the desired buoyant properties.

The wire members or links which are employed to interconnect the sections 8 and 10 are denoted generally by the numerals 24 and 26, respectively. The link 24 has a rounded bight portion 28 and embodies complemental limbs or arms 30 and 32. The forward end of the limb 32 extends through a hole 34 provided therefor in the end 12 of the section 8. The hole may be bushed or otherwise made water-tight (not detailed). The extreme end portion 36 is fashioned into an eye by twisting the wire 38 in the manner shown. This eye 36 serves to accommodate a cooperating eye 40 on the line portion 42. It will be noted also at the left in FIG. 2 that the forward end of the limb 30 is coiled or twisted around the limb 34 to thus connect the limbs together in elongated loop form.

With reference now to the right-hand link 26, this is also formed from a length of wire bent upon itself between its ends to provide a bight portion 46, and the limbs here are denoted at 48 and 50 as perhaps best shown in FIG. 1. The terminal end of the limb 48 is fashioned into an eye 52 by twisting the wire at 54 in the manner shown. Also, the end portion of the limb 50 is coiled or twisted at 56 around the wire portion 58 to provide the elongated formation desired. The line portion 60 has an eye 62 connected with the eye 52.

It may be explained at this point that the extensible and retractable sectional capsule provides a convertible float-sinker or, conversely, a sinker-float which is incorporated in the fishline in the manner illustrated, preferably a short distance above the bait. Experience has shown that when the device is properly constructed as illustrated, the sections never separate. The capsule simply extends or contracts, and when it is extended it will permit water to fill the inside of the device, and when it is contracted it becomes a closed air chamber or float. When the fisherman reels in his bait, he merely holds the device so that it will drain and then closes it and he is ready to start fishing downstream again in a seemingly obvious manner.

Although it is not settled, it will be evident that the device may be made in two or three different sizes. However, it is believed that the manufacturer, after trial and error, may perhaps standardize on a single acceptable size. It is also within the purview of the invention to resort to varying shapes and colors and to actually use the device as a sort of lure. With the bent or bight portions 46 and 28 interlinked, it will be evident that since the outer ends thereof are connected to the respective sections 8 and 10, the sections 8 and 10 cannot be pulled apart.

It may be further pointed out that the interior size of the larger section is slightly tapered so that the inner one cannot be pushed into it as far as possible. As a matter of fact, the construction and dimensions of the components 8 and 10 are such that the farther the smaller one is pushed into the larger one, the more firmly they are fastened together due to the taper present.

As before touched upon, the "float" is shown in FIGS. 1 to 4, inclusive, wherein the ports 18 and 20 are covered or blocked and thus closed and kept closed. When the line 42 is jerked sharply and the links are pulled apart, the sections 8 and 10 separate, at which time the ports 18 and 20 are then uncovered and open as shown in FIG. 5. Consequently, the device loads itself with water and then converts to the sinker desired.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A convertible float and sinker designed and adapted to be embodied in a fishing line adjacent to the baited end of the line comprising an elongated hollow body having openable and closable ports, said body being normally charged with air and said ports being normally closed to retain the air in the body and thus providing a float, the ports when intentionally uncovered and open allowing water to flow into the hollow portion of the body in a manner to load the body to the point that it becomes sufficiently heavy, relatively speaking, to function as a sinker, said body being made up of telescopically connected cooperating sections, and remote control means incorporated in said body and cooperable with the sections for purposes of sliding the sections relative to each other in a manner to open and close said ports, said means embodying elongated links carried by the respective sections and having inner adjacent ends operatively linked together, said remote control links, when used to slide and extend the sections, serving to position said ports in open position so that water may pass therethrough in a manner to load the hollow portion of the body with water.

2. A convertible float and sinker comprising an elongated capsule embodying complemental hollow sections having adjacent ends telescopically connected and defining a hollow body, said sections when pushed together or pulled apart permitting the body to be longitudinally extended or contracted, the adjacent cooperating telescoping portions of the sections being overlapped and provided with openable and closable ports, said ports being normally covered and closed and when intentionally uncovered and open permitting water to flow therethrough and the hollow chamber of the body to be thus charged with water, an elongated remote control link located in the hollow portion of each capsule section and secured at an outer end portion to a corresponding outer end portion of the cooperating section, the outer ends of said links projecting beyond the outer ends of said sections and having available eyes for connection with cooperating portions of a fishing line, said links having their inner ends slidingly coupled together, said remote control links, when used to slide and extend the sections, serving to position said ports in open position so that water may pass therethrough in a manner to load the hollow portion of the body with water.

3. A convertible float and sinker construction comprising an extensible and contractible capsule embodying a first elongated hollow capsule section closed at an outer end and open at an inner end and provided adjacent the open end with ports, a second hollow capsule section similar to the first section and also closed at its outer end and open at its inner end and likewise provided with ports, the respective inner ends of the respective sections being telescopically connected together so that the respective ports may be normally covered and closed when the capsule is contracted and uncovered and opened when the capsule is extended, each section being provided interiorly with a permanently attached link, and said links having coacting adjacent end portions connectible and cooperating and providing remote control means for sliding the sections apart and lengthening the over-all capsule and thus extending the sections, said remote control links, when used to slide and extend the sections, serving to position the ports in open position so that water may pass therethrough in a manner to load the hollow portion of the body with water.

4. A convertible float and sinker comprising an elongated longitudinally extensible and contractible capsule embodying complemental hollow sections having adjacent ends telescopically connected and defining a hollow body, said sections when pushed together or pulled apart permitting the body to be longitudinally extended or contracted, the adjacent cooperating telescoping portions of the sections being overlapped and provided with openable and closable ports, said ports being normally covered and thus closed and when uncovered and thus opened permitting the hollow chamber of the body to be charged with water entering the chamber by way of the open ports, an elongated link located in the hollow portion of each capsule section and secured at an outer end portion to a corresponding outer end portion of the cooperating section, the outer ends of said links projecting beyond the outer ends of said sections and having available eyes for connection with cooperating portions of a fishing line, said links having their inner ends slidingly coupled together, said links providing remote control means for extending the sections and lengthening the chamber, said links when used to slide and extend the sections serving to position said ports in an open position, so that water may pass therethrough in a manner to load the hollow portion of the body with water, each link being fashioned from a length of wire bent upon itself and defining an elongated loop, said loop embodying a rounded bight portion at the inner end of the link and also embodying complemental limbs, both limbs being confined within the hollow portion of the body, the aforementioned coupled connection between the inner ends being effected by linking the respective bight portions and permitting said bight portions to positively engage each other to limit the degree that the sections may be pulled apart and to prevent complete separation of the sections whereby said links have the additional function of keeping the sections assembled at all times.

5. A convertible float and sinker comprising, in combination, an elongated transparent capsule embodying complemental hollow sections having cylindrical cross-sectional form and having adjacent ends telescopically connected and adapted to be pushed together by hand to permit the capsule to be shortened, and pulled apart either by hand or by action of the fishing line to lengthen the over-all capsule, the adjacent cooperating telescoping end portions of the sections being overlapped and provided with openable and closable ports, said ports being normally blocked and in this manner closed but being capable of being unblocked and thus opened in a manner permitting the hollow chamber of the body to then be charged with water, the outer ends of said sections being provided with available line attaching eyes with which adjacent ends of portions of the fishing line may be connected so that by exerting a pull on the line the sections may be slid apart in a manner to permit the ports to uncover and open and to allow the aforementioned charging of the chamber with water, said capsule when empty with the ports blocked and closed being buoyant and constituting a float, and when loaded with water, when the ports are unblocked and open, constituting a sinker, and individual but cooperating links confined for operation in the chamber and having outer ends connected to the respective sections and having inner ends cooperating in a manner to limit the relative outward sliding movement of the sections.

References Cited in the file of this patent

UNITED STATES PATENTS

| | | |
|---|---|---|
| 1,056,494 | Blee et al. | Mar. 18, 1913 |
| 2,183,816 | Lovelace | Dec. 19, 1939 |
| 2,519,427 | Besmer | Aug. 22, 1950 |
| 2,532,879 | Baker | Dec. 5, 1950 |
| 2,706,359 | Beames | Apr. 19, 1955 |
| 2,761,238 | Shiverdecker | Sept. 4, 1956 |

FOREIGN PATENTS

| | | |
|---|---|---|
| 922,981 | France | Feb. 10, 1947 |